May 19, 1970  KENZI KATO  3,513,373
SPEED CONTROL CIRCUIT FOR MOTOR
Filed April 18, 1968

INVENTOR.
KENZI KATO
BY
Linton and Linton
ATTORNEYS

United States Patent Office 3,513,373
Patented May 19, 1970

3,513,373
SPEED CONTROL CIRCUIT FOR MOTOR
Kenzi Kato, Tokyo, Japan, assignor to Janome Sewing Machine Co., Ltd., Tokyo, Japan
Filed Apr. 18, 1968, Ser. No. 722,486
Claims priority, application Japan, Apr. 18, 1967, 42/24,223
Int. Cl. H02p 7/62
U.S. Cl. 318—227　　　　　　　　　　1 Claim

ABSTRACT OF THE DISCLOSURE

A speed control circuit for an alternating current motor employs a symmetrical semiconductor switch connected between the alternating current source and the motor. The time constant of the control circuit is made variable dependent upon load requirements, thereby adjusting the phase conduction of the semiconductor element and effecting constant motor speed.

---

This invention relates to a speed control circuit for a motor, using symmetrically placed semiconductor switch elements. The object of the present invention is to provide a circuit which is responsive to the fluctuation of a load to automatically adjust the continuity phase angle, and thereby to keep the motor at a set speed at all times.

Figure 1:
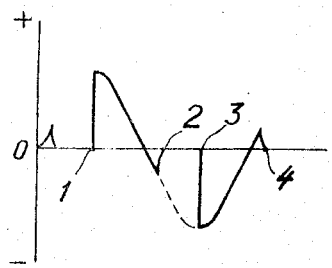
FIG. 1 is a diagram showing a general wave shape of the terminal voltage of a motor controlled by a control circuit using symmetrical semiconductor switch elements.

For example, when speed control of a single phase series commutator motor is made by a circuit using symmetrical semiconductor switch elements, the terminal voltage of the motor generally becomes of the type as shown at FIG. 1. The discontinuity phases numbered 2 and 4 in this figure, namely, the phases in which the semiconductor switch element for the main circuit becomes discontinuous, lag in correspondence to the lowering of the motor speed of revolution due to the increase of load torque.

On the contrary, when the speed of revolution increases due to reduction of load torque, these discontinuity phases advance. Such a phenomenon makes it disadvantageously impossible to properly obtain a stabilized operation especially when the load torque is thus varied.

An object of the present invention is to effectively remove the above disadvantage of the prior art, and to provide a circuit which is capable of controlling the continuity phases 1 and 3 in FIG. 1 and making them a terminal voltage of motor in correspondence to the status of the load, by utilizing the aforementioned phenomenon in which the discontinuity phase of the semiconductor element for the main circuit is variable with the fluctuation of load. Namely, as shown in FIG. 1, the present invention is to provide the advantages that the voltage polarity at the time of discontinuity of the semiconductor switch element for the main circuit is reversed to the voltage polarity of said element at the time of being charged and moreover, that such discontinuity phase varies in the region of reversed polarity in accordance with the load condition.

Since the discontinuity polarity agrees with the subsequent continuity polarity, it is intended to control the continuity phase of the symmetrical semiconductor switch element for the main circuit by making the variation of voltage respond to the terminal voltage of the symmetrical semiconductor switch element for operation ignition, which variation of voltage is produced by the phase discontinuity in accordance with the load status. In order to make the status of the load react to the ignition operation element, the time constant of the circuit, which takes effect upon the rise of voltage applied to the ignition operation element, is made smaller at the time of continuity of the semiconductor element for the main circuit than at the time of discontinuity thereof.

Moreover, since the control of voltage relies upon adjustment of the continuity angle phase, that control is performed within the region of the power voltage. Thus, if the load torque increases, the continuity of the symmetrical semiconductor switch element for the main circuit is accordingly advanced, while if the load torque decreases that continuity becomes accordingly lagging and thereby the adjustment of the continuity angle phase is performed to obtain a stabilized working condition property of the motor.

Figure 2:
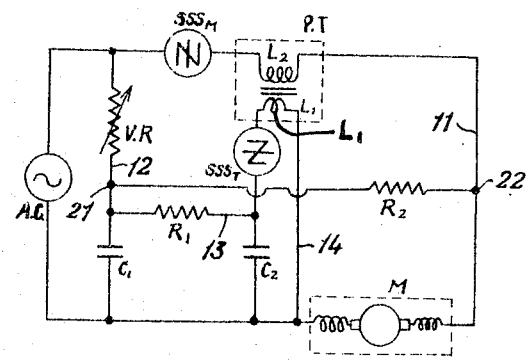
FIG. 2 is a diagrammatic circuit including the present invention.

To explain the embodiment of the present invention, with reference to FIG. 2, in a closed main circuit 11, a symmetrical semiconductor switch element $SSS_M$ (hereinafter called circuit element), a secondary winding $L_2$ of pulse transformer PT, and a single phase series commutator motor M, are connected in series with an AC power source, designated AC, in the order as illustrated. Between the terminals of the power source AC, a variable resistor VR and a first condenser $C_1$ form a series circuit 12, and further to the first condenser $C_1$ is connected in parallel a series circuit 13, consisting of a first fixed resistor $R_1$ and a second condenser $C_2$. To the second condenser $C_2$ is connected another series circuit 14, consisting of an ignition symmetrical semiconductor switch element $SSS_T$ (hereinafter called ignition operation element $SSS_T$) and a primary winding $L_1$ of pulse transformer PT. These circuits 12, 13, and 14 form an ignition operation circuit. Further, according to the present invention, a second resistor $R_2$ is connected between the junction 21 of said variable resistor VR and the first condenser $C_1$ and the common point 22 of the secondary winding $L_2$ of the pulse transformer PT and the terminal of motor. M.

In this case, the impedance of said secondary winding $L_2$ is made smaller than the impedance of motor M and resistor $R_2$.

The circuit of the above construction operates as follows: Adjustment of the resistance value of variable resistor VR changes the signal phase through the changing time constant of the switch circuit comprising said variable resistor VR, said first and second condenser $C_1$ and $C_2$, the first resistor $R_1$, ignition operation element $SSS_T$ and the primary winding $L_1$ of pulse transformer PT, so as to adjust the continuity angle of main circuit element $SSS_M$, and thereby a controlled voltage is applied to motor M. In the present circuit, the second resistor $R_2$, provided between the junction points 21 and 22, as illustrated, forms a resistor circuit in parallel to said switch circuit portion so as to make the time constant of the circuit, which applies voltage to ignition operation element $SSS_T$, smaller at the time of continuity of the main circuit element $SSS_M$ than at the time of discontinuity thereof.

Figure 3:
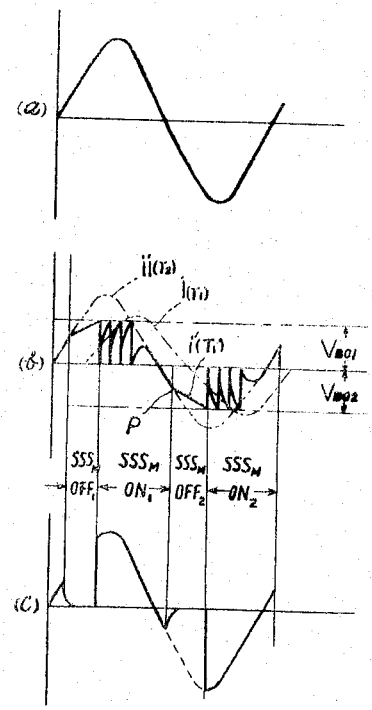
FIG. 3 is a wave diagram showing power voltage wave shape, terminal voltage wave shape of the ignition operation semiconductor switch element, and the terminal voltage wave shape of the motor, in comparison to each other.

To explain the principle in which the continuity phase of the main circuit element $SSS_M$ is controlled by the load status in reference to the terminal voltage wave shape of ignition operation element $SSS_T$ during the operation of this circuit as illustrated in FIG. 3 and (a) of FIG. 3 represents a wave shape of the power source voltage, (b) of FIG. 3 represents wave shapes of the terminal voltage of ignition operation element $SSS_T$, and (c) of FIG. 3 represents a wave shape of the terminal voltage of the motor. In FIG. 3(b), the two-dot chain line (ii) represents the wave shape of terminal voltage of ignition operation element $SSS_T$ when the main circuit element $SSS_M$ is in continuity. In this case, the time constant $T_2$ of a circuit, which applies voltage to ignition operation element $SSS_T$, is relatively small at all times. Namely, the resistance value of the service circuit to the second condenser $C_2$ is always smaller than the value at the time of discontinuity of main circuit element $SSS_M$. The one-dot chain line (i) (FIG. 3b) represents the wave shape of main circuit element $SSS_M$ when it is discontinuous. In this case, the time constant $T_1$ of the circuit applying voltage to ignition operation element $SSS_T$ is always larger than the time constant $T_2$. Thus, as clearly appears from these diagrams, the voltage wave shape $i$ is smaller in amplitude than the voltage wave shape $ii$ and the former follows the latter in phase. It is, however, to be noted that these wave shapes are represented for convenience of explanation, and actually no wave shape appears beyond the realm of the breakover voltage defined by voltage$_{BO1}$ and voltage$_{BO2}$ of ignition operation element $SSS_T$.

In the region $SSS_M$–$OFF_1$ (FIG. 3c) at the time when the main circuit element $SSS_M$ is in discontinuity, the voltage applied to $SSS_T$ firstly reaches the breakover voltage $V_{BO1}$ on the left side of $SSS_T$ through a circuit of time constant $T_1$, comprising VR, $C_1$, $C_2$, and $R_1$, is applied to main circuit element $SSS_M$ and enters the region $SSS_M$–$ON_1$ (FIG. 3). In this region $ON_1$, a circuit is formed to feed condenser $C_1$ through resistor $R_2$ and joins to the circuit of time constant $T_1$ and thereby the time constant $T_1$ is changed to $T_2$. Thus, the voltage rise of $SSS_T$ becomes faster than it was in the case with time constant $T_1$, and said applied voltage oscillates with time constant $T_2$, while the amplitude of wave shape $ii$ (FIG. 3) ($T_2$) is over voltage$_{BO1}$. After that while main circuit element $SSS_M$ is in continuity, the voltage advances on the line of wave shape $ii$ ($T_2$) with the voltage polarity of $SSS_T$ reversed as illustrated. When main circuit element $SSS_M$ becomes discontinuous, the voltage enters the region $SSS_M$–OFF, and a circuit feeding the condenser $C_1$ through resistor $R_2$ becomes discontinuous to return the time constant $T_2$ to $T_1$.

Then feeding is again started until another breakover of igition operation element $SSS_T$ is reached along the wave shape $i'$ (FIG. 3) with this time constant $T_1$, which wave shape $i'$ is appropriately in parallel to the wave shape $i$.

Accordingly, assuming that P (FIG. 3) is the time point when the time constant is shifted from $T_2$ to $T_1$, the gradient of voltage rise changes at this point since the position of point P depends upon the phase in which main circuit element $SSS_M$ becomes discontinuous, when point P lags by increase of the load torque, the ignition operation element $SSS_T$ reaches breakover voltage $V_{BO2}$ earlier and the continuity phase of the subsequent cycle is advanced. On the contrary, when point P advances, due to decrease of load torque, the continuity phase of the subsequent cycle lags. Accordingly, in the present cycle, when the load torque increases, the terminal voltage of the motor rises, and on the contrary, when the load torque decreases, the terminal voltage of the motor lowers to prevent a big change in the speed of revolution of the motor due to the fluctuation of load torque.

Figure 4:
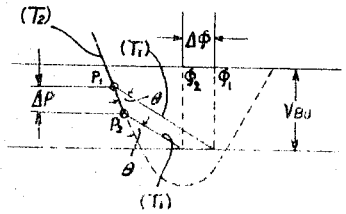
FIG. 4 is an explanatory wave form diagram showing the variation of the breakover phase of an ignition operation semiconductor switch element in accordance with the present invention.

Further, to explain the reason why the breakover phase of ignition operation element $SSS_T$ is influenced by the shift of point P, reference is made to FIG. 4, which is drawn somewhat exaggeratedly for convenience of explanation. Assuming that with time constant converted from $T_2$ to $T_1$ at point $P_1$, the voltage reaches breakover of ignition operation element $SSS_T$ at point $\phi_1$. If the point shifts from $P_1$ to $P_2$ (FIG. 4) as the load increases, the time constant is converted from $T_2$ to $T_1$ at this point $P_2$ so that the breakover phase advances to point $\phi_2$ as clearly shown in this figure. If the difference $\Delta p$ between $P_1$ and $P_2$ is constant, the difference $\Delta \phi$ between points $\phi_1$ and $\phi_2$ is larger as $\theta$ in this figure becomes larger or the difference is larger between the time constants in the circuit feeding ignition operation element $SSS_T$ due to continuity and discontinuity of main circuit element $SSS_M$, and the difference $\Delta \phi$ becomes zero when the voltage is zero. Since condenser $C_2$ is more charged at point $P_2$ than at point $P_1$, it is natural that the voltage charged at point $P_2$ reaches breakover line $V_{BO}$ (FIG. 4) earlier than that charged at point $P_1$ when the charge is started again at respective points $P_1$ and $P_2$ with the time constant larger than the precedent one. Thus, as clearly appears from FIG. 2, the difference between time constants $T_1$ and $T_2$ in the present circuit is determined by the difference between the compound resistance value of variable resistor VR and second resistor $R_2$ which is connected in parallel to variable resistor VR when main circuit element $SSS_M$ is in continuity and the single resistance value of variable resistor VR when main circuit element $SSS_M$ is in discontinuity.

What is claimed is:

1. In a speed control circuit for a motor, an alternating current motor, a source of alternating current, a variable resistor and a first condenser connected in series across the first and second terminals of said source, a pulse transformer having a primary and a secondary, a first diode semiconductor connected in series between the first terminal of said source and a first terminal of said secondary, a first terminal of said motor being connected to the second terminal of said secondary, the second terminal of said motor being connected to the second terminal of said source, a first terminal of said primary being connected to the second terminal of said motor, a second condenser having a first terminal connected to the second terminal of said motor, a second diode semiconductor connected between the second terminal of said second condenser and the second terminal of said primary, a first fixed resistor being connected between the common connection point of said variable resistor and said first condenser, and the common connection point of said second diode semiconductor and said second condenser, and a second fixed resistor connected between the common connection point of said variable resistor and said first condenser, and the common connection point of the connection between the second terminal of said secondary and the first terminal of said motor.

References Cited

UNITED STATES PATENTS 3,336,517   8/1967   Cain _____ 318—345 XR
3,390,317   6/1968   De Sisto _____ 318—227 XR ORIS L. RADER, Primary Examiner G. ROBINSON, Assistant Examiner U.S. Cl. X.R.

318—345